United States Patent
Kawahito (10) Patent No.: US 10,705,887 B2
(45) Date of Patent: Jul. 7, 2020

(54) COPYING OBJECTS BETWEEN PROGRAMMING LANGUAGES

(71) Applicant: INTERNATIONAL BUSINESS MACHINES CORPORATION, Armonk, NY (US)

(72) Inventor: Motohiro Kawahito, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/135,051

(22) Filed: Sep. 19, 2018

(65) Prior Publication Data
US 2020/0089548 A1    Mar. 19, 2020

(51) Int. Cl.
G06K 9/36      (2006.01)
G06F 9/54      (2006.01)
G06F 8/30      (2018.01)

(52) U.S. Cl.
CPC .............. *G06F 9/541* (2013.01); *G06F 8/315* (2013.01)

(58) Field of Classification Search
CPC ................................. G06F 9/541; G06F 8/315
See application file for complete search history.

(56) References Cited

U.S. PATENT DOCUMENTS

| 6,553,428 | B1 * | 4/2003 | Ruehle | G06F 9/465 |
| | | | | 719/316 |
| 6,901,588 | B1 * | 5/2005 | Krapf | G06F 9/4488 |
| | | | | 717/164 |
| 7,840,951 | B1 | 11/2010 | Wright et al. | |
| 10,162,840 | B1 * | 12/2018 | Carter | G06F 16/24539 |
| 2011/0145835 | A1 * | 6/2011 | Rodrigues | G06F 9/526 |
| | | | | 719/312 |
| 2011/0219209 | A1 * | 9/2011 | Reynolds | G06F 9/30 |
| | | | | 712/16 |
| 2012/0042325 | A1 | 2/2012 | Inglis et al. | |
| 2014/0189171 | A1 | 7/2014 | Dawson et al. | |

OTHER PUBLICATIONS

Peter Mell et al, The NIST Definition of Cloud Computing, National Institute of Standards and Technology, Publication 800-145, 2011, entire document.
Michael Dawson et al, Best practices for using the Java Native Interface, developerWorks, IBM Corporation, 2009, entire document.

\* cited by examiner

*Primary Examiner* — Andy Ho
*Assistant Examiner* — Abdou K Seye
(74) *Attorney, Agent, or Firm* — Patrick J. Daugherty; Daugherty & Del Zoppo Co. LPA (57) ABSTRACT

Aspects of the present invention provide devices that generate an array in a first memory of a first programming language that includes an element of each object of a plurality of objects, wherein the array includes a plurality of items, and each item of the array includes the element of a corresponding object, copy the array in the first memory of the first programming language to a second memory of a second programming language, and generate each of the objects in the second programming language from the copied array.

17 Claims, 6 Drawing Sheets

COPYING OBJECTS BETWEEN PROGRAMMING LANGUAGES

BACKGROUND

The field of computer programming languages includes the passing of data between different programming languages.

Computer programming languages can define data types differently. For example, numerical fields can include different Endian order. More complex data structures, such as objects can include different internal structures that are managed by the corresponding programming language runtime environment or framework. For example, objects, such as in the JAVA® programming language, are accessible only within a JAVA program during runtime. JAVA is a registered trademark in the United States or in other countries.

The object is defined by elements or attributes, which further describe the object. For example, objects of an object type of rectangles can be described by elements of a width, and a length. A first object of the rectangles is defined by the element width of 1.7, and the element length of 2.5. A second object of the rectangles is defined by a width of 5.1 and a length of 7.3. Programming languages can manage and/or refer to the objects, the elements, and combinations thereof differently.

Programs written in different languages typically use interfaces provided with runtime environments to copy data from a first program in a runtime memory of a first programming language to a run time memory of a second program in a second programming language. However, interfaces typically do not provide direct copying of complex data structures, such as objects. For example, JAVA provides a JAVA Native Interface (JNI), which is a programming language framework that enables JAVA code running in a JAVA Virtual Machine (JVM) to call and be called by programs written in other languages, such as C, C++ and assembly. The JNI does not allow direct access to objects, but does provides an interface by which data contained in objects can be copied between the JAVA program to the C program.

BRIEF SUMMARY

In one aspect of the present invention, a computer-implemented method for copying objects between programming languages includes executing on a computer processor generating an array in a first memory of a first programming language that includes an element of each object of a plurality of objects, wherein the array includes a plurality of items, and each item of the array includes the element of a corresponding object, copying the array in the first memory of the first programming language to a second memory of a second programming language, and generating each of the objects in the second programming language from the copied array.

In another aspect, a system has a hardware processor, computer readable memory in circuit communication with the processor, and a computer-readable storage medium in circuit communication with the processor and having program instructions stored thereon. The processor executes the program instructions stored on the computer-readable storage medium via the computer readable memory and thereby copies objects between programming languages which generates an array in a first memory of a first programming language that includes an element of each object of a plurality of objects, wherein the array includes a plurality of items, and each item of the array includes the element of a corresponding object, copies the array in the first memory of the first programming language to a second memory of a second programming language, and generates each of the objects in the second programming language from the copied array.

In another aspect, a computer program product for copying objects between programming languages has a computer-readable storage medium with computer readable program code embodied therewith. The computer readable hardware medium is not a transitory signal per se. The computer readable program code includes instructions for execution by a processor that cause the processor to generate an array in a first memory of a first programming language that includes an element of each object of a plurality of objects, wherein the array includes a plurality of items, and each item of the array includes the element of a corresponding object, copy the array in the first memory of the first programming language to a second memory of a second programming language, and generate each of the objects in the second programming language from the copied array.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
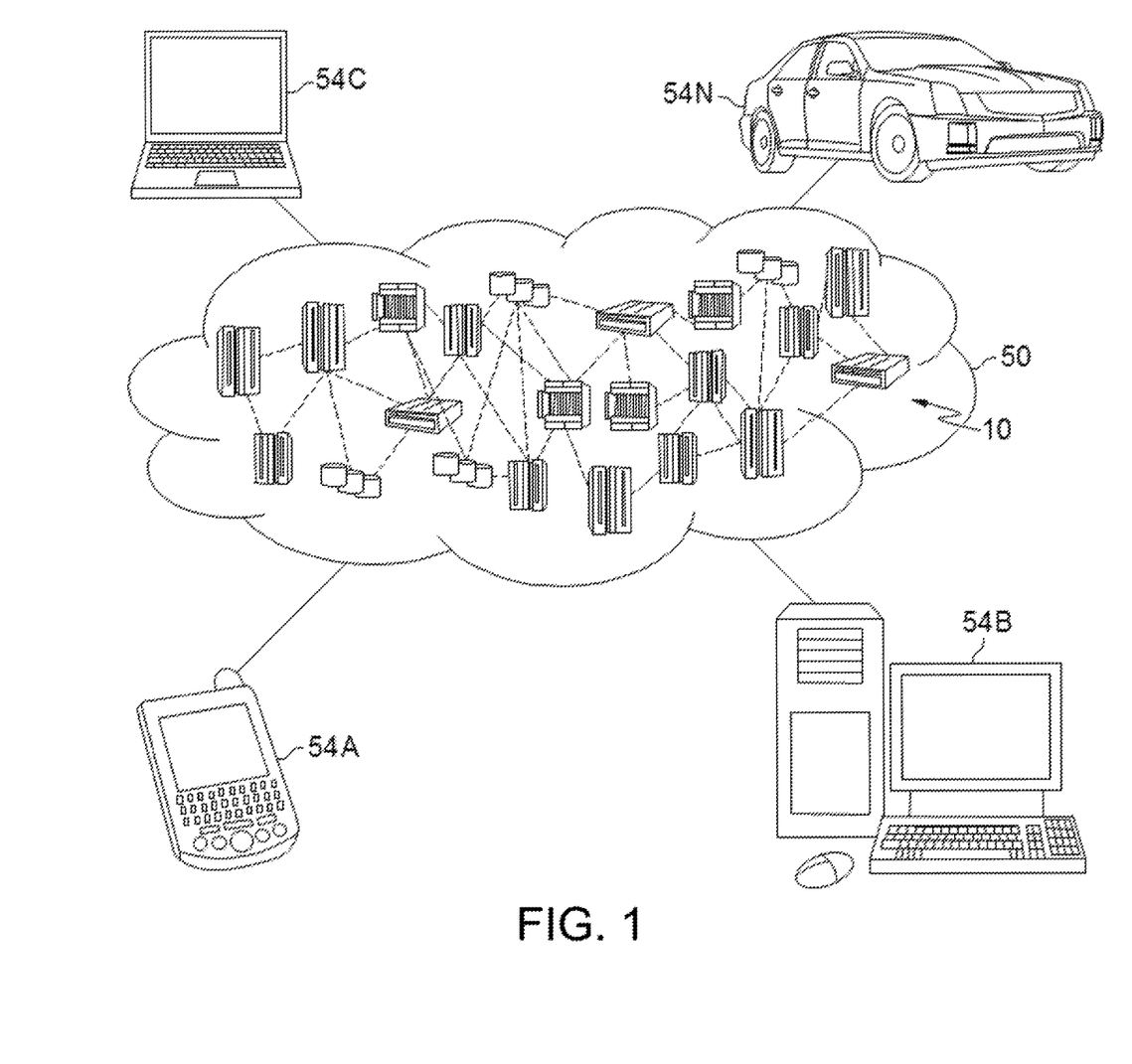
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
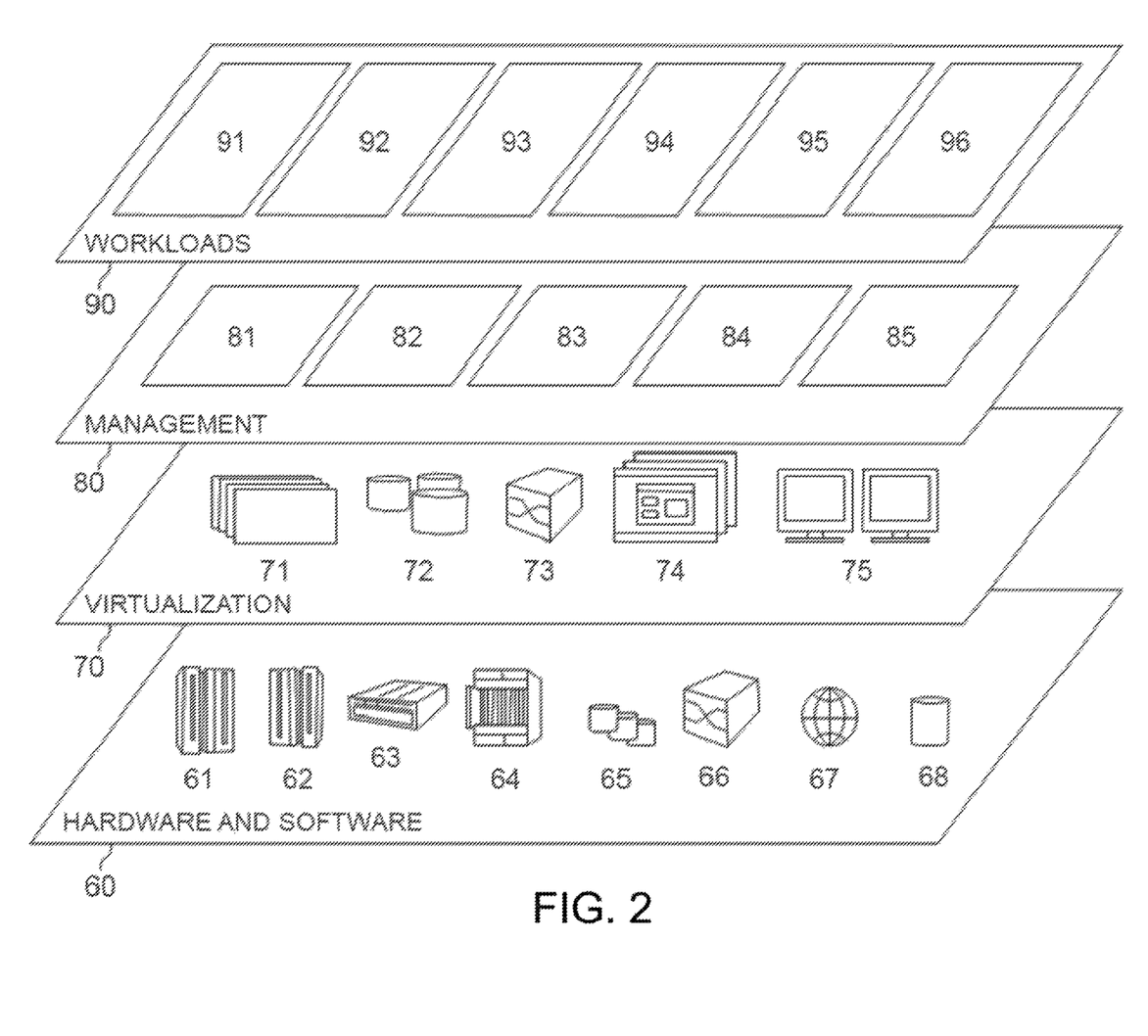
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for copying objects between programming languages 96.

Figure 3:
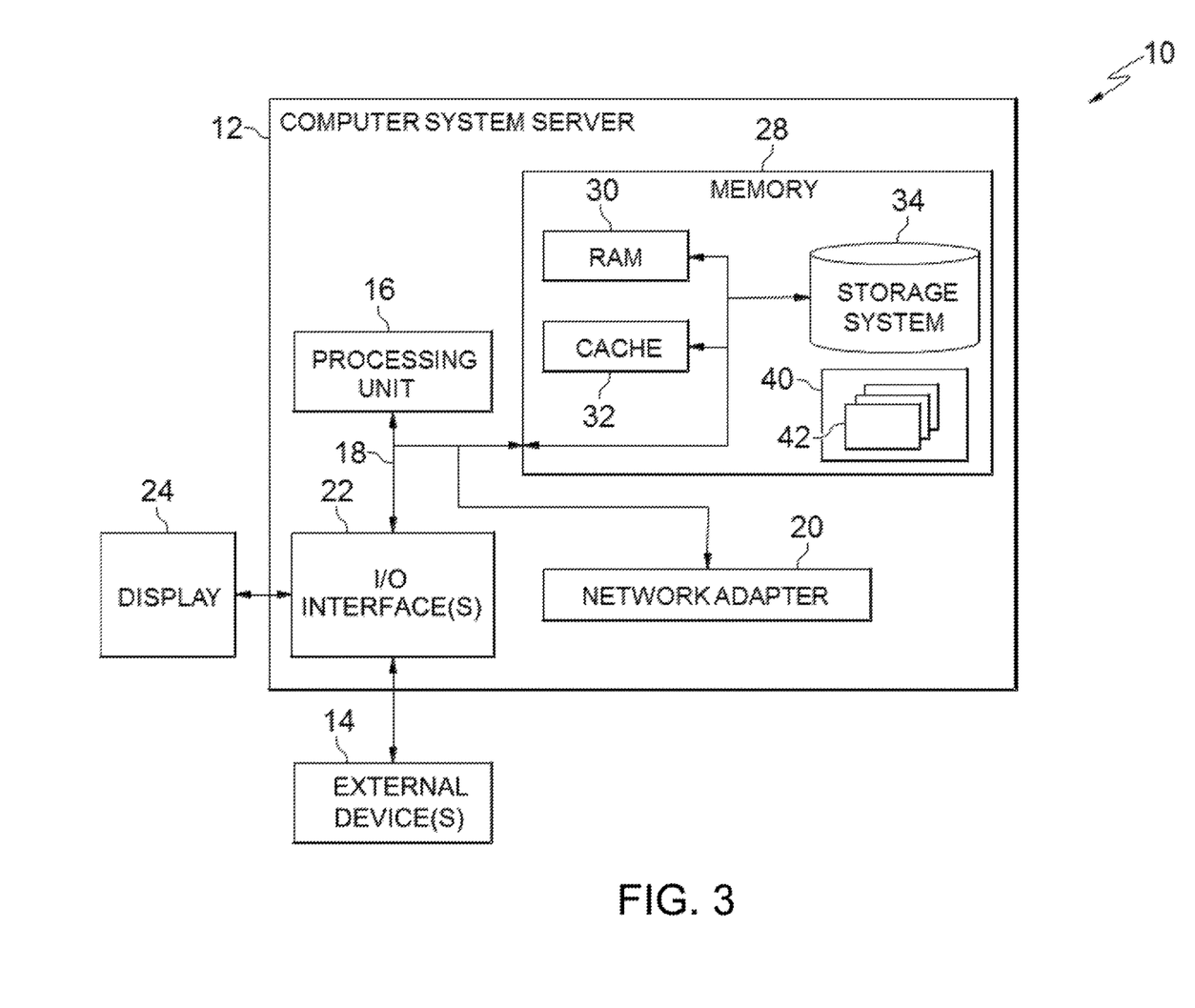
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 4:
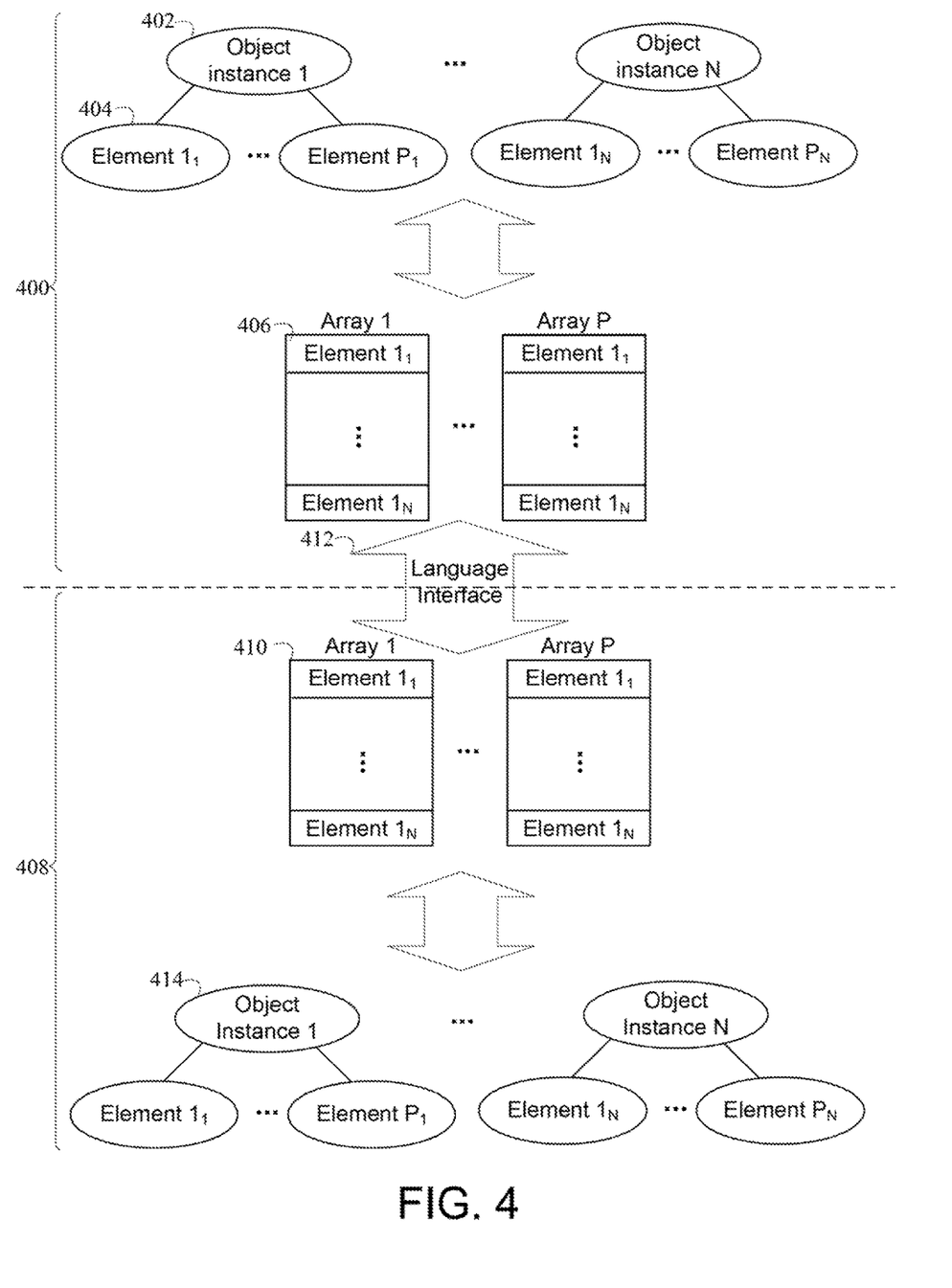
FIG. 4 depicts an example schematic illustration of an embodiment of the present invention.

FIG. 4 schematically illustrates an example according to the present invention for copying objects between programming languages. A programming language includes a run time memory, a programming language environment, a programming language framework, and the like, which is used by data structures defined within the programming language, such as objects. A first memory 400 of a first programming language or programming language framework includes N objects 402, where N is a positive integer. That is, the objects 402 include N instances of a defined object or N objects of a same type. Each of the objects 402 includes one or more elements 404 or attributes, P, where P is a positive integer. The elements 404 further describe or define the corresponding object 402. For example, the first memory includes 204,000 objects of a score table, and each object includes elements of an integer identifier (ID) and a floating point score. The ID and score of the score table according to each instance of the object 402 can vary. The first memory 400 is suitably embodied by the memory 28 controlled by a run time routine, such as a JAVA virtual machine (JVM).

A configured processor, suitably embodied as the processing unit 16, generates one or more arrays 406 in the first memory 400 in a first programming language. Each array 406 includes the corresponding elements 404 from each of the N objects 402. For example, a first array includes a first element from each object, such as the same element ID of score table objects. A second array includes a second element from each object, such as the same element score of score table objects. Each array 406 includes the corresponding element 404 from each object 402. The objects 402 are ordered and the order of elements 404 in each array 402 is the same as the order of the objects 402. That is, the array 406 is a linear array of the ith elements ordered by object 402, and the ith element of each array 406 includes the elements of the ith object.

In some instances, a count of the objects 402 is greater than a count of the elements 404 of each object 402 or the arrays 406. For example, N is greater than P by one or more orders of magnitude. For example, with 345,000 objects and each object is defined by 3 elements, there are 3 arrays, each array including 345,000 elements. N is 345,000 which is orders of magnitude greater than 3.

The configured processor copies the arrays 406 from the first memory 400 of the first programming language to arrays 410 a second memory 408 of a second programming language. The copying can be via parameter passing and/or program code. For example, JAVA program A calls C program Y and passes parameters of the array 1 to the array P of 406. The C program Y calls JNI methods to populate values of array 1 to array P of 410. The second memory 408 is suitably embodied by the memory 28. In some embodiments, the copying occurs via a programming language framework interface 412, such as the JAVA Native Interface (JNI) of the JAVA programming language. Some vendors of programming languages impose a specific interface to data within the language for access by other programming languages.

In some embodiments, the copying occurs in a same process thread, such as a JAVA program compiled and linked with a C program. In some embodiments, the copying occurs across threads, such as distributed across the nodes 10.

The first and second programming languages are different. The first and second programming languages can include combinations of the JAVA programming language, the C programming language, a C++ programming language and an assembly programming language. For example, the first programming language includes JAVA and the second programming language includes C. In another example, the first programming language includes C and the second programming language includes JAVA. Other programming languages are contemplated.

The configured processor generates N objects 414 in the second programming language from the copied arrays 410. The N objects 414 in the second programming language are the equivalent of the N objects 402 in the first programming language. That is, from a corresponding jth element in each of the copied arrays 410 the jth object 414 is generated, which is an equivalent of the jth object 402 in the first programming language.

The direction of copying can vary by instance and in some instances can include both directions. For example, a collection of objects are generated in JAVA and copied to C, further processed in C, and then copied back to JAVA for additional processing. In another example, the objects are generated in C and then copied to JAVA.

In each copying, the objects are disassembled into arrays, the arrays copied between programming languages, and then the arrays are reassembled into objects. The use of arrays provides performance improvements over conventional techniques. Conventional techniques address a problem that objects are often represented differently in different programming languages and typically cannot be copied directly between programming languages.

One conventional technique breaks elements of each instance of an object down into individual primitive fields and copies each primitive field serially through the interface 412. For example, in copying instances of an object of score table defined by elements of ID and score between a JAVA program to a C program, JAVA.lang.Class.getField( )/JAVA.lang.Class.putfield( ) programming language statements can be used to copy the ID and score of each score table by object through the JNI. That is, a first getfield copies the ID of a first score table into the program, a second getfield copies the score of the first score table into the program, a third getfield copies the ID of the second score table into the program, and a fourth getfield copies the score of the second score table into the program, etc. The getfield statement is used for the JAVA program receiving the object, and a putfield statement is used for the JAVA program sending the object.

The program within programming language disassembles/reassembles of the individual fields into the object within the context of the sending/receiving programming language. One disadvantage to this technique is the processing time to completely disassemble and reassemble each object into more primitive fields, which are more universally accessible by other programming languages.

Another conventional technique is to include some programming intelligence in copying the objects serially. For example, the JNI allows for a programming method to be called. The programming method allows for preparation of all the elements of each object to be copied as a collection through the interface 412, which can provide some performance gains over the serialization of primitive fields. For example, an object with elements A, B and C can be passed as three fields assembled by the programming method and accessible via the interface 412.

In some testing, which included caching to improve conventional processing, use of the called programming method reduced processing time to approximately 60% of a time to process using the serialization of primitive fields. The use of arrays reduced processing time to approximately 31% of the time to process using the serialization of primitive fields, which is a 50% improvement over the called method technique.

Figure 5:
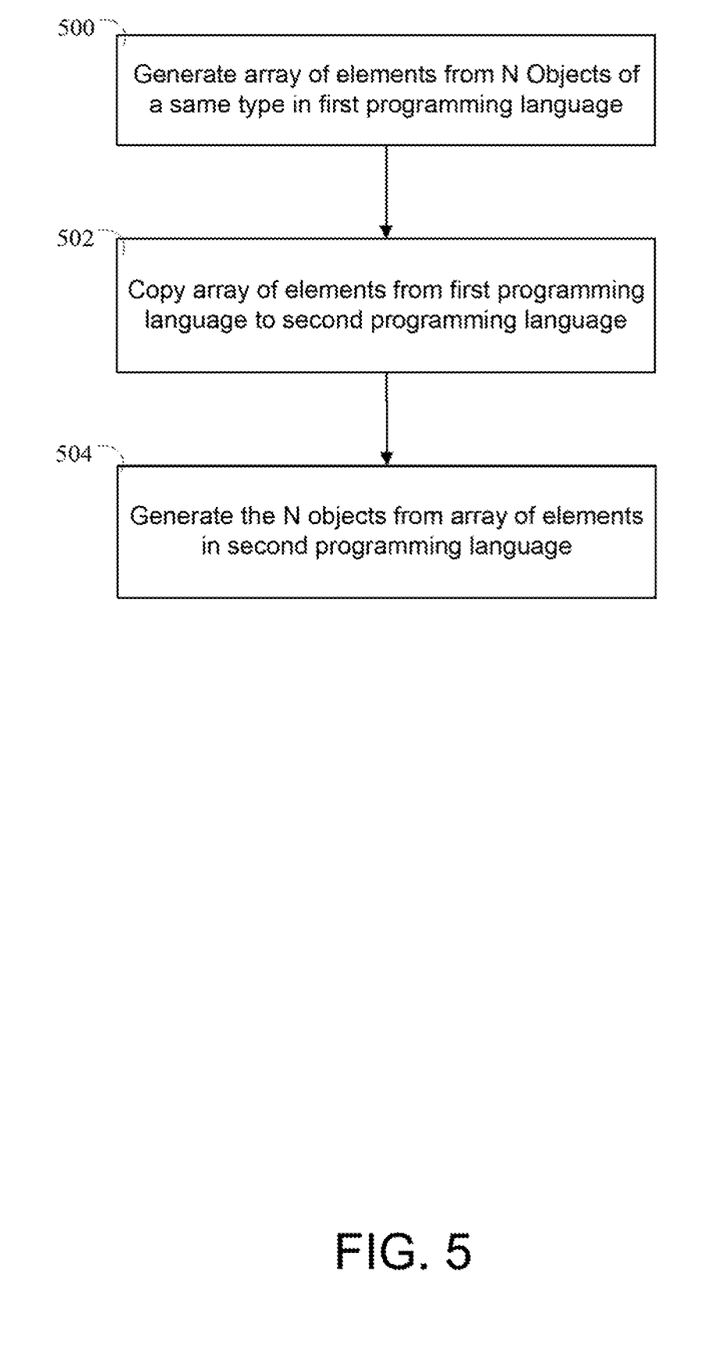
FIG. 5 is a flow chart illustration of an embodiment of the present invention.

FIG. 5 illustrates one embodiment of a method according to the present invention for copying objects between programming languages. At 500, a processor that is configured according to an aspect of the present invention (the "configured processor") generates an array 406 in the first memory 400 that includes an element 404 of each object 402 of a plurality of objects in a first programming language. The objects are of a same type. The plurality of objects includes N objects, where N is a positive integer greater than 1. In some embodiments, each object 402 includes a plurality of elements 404, and generating the array 406 includes generating a plurality of arrays, one array for a same element of the plurality of objects. In some instances, a count of the objects exceeds a count of the array 406 by an order of magnitude, $10^z$, where z is a positive integer.

At 502, the configured processor copies the array 402 in the first memory 400 to the second memory 408 of the second programming language. The array 410 in the second memory includes a same order of elements in the array 410 as the array 402 in the first memory 400, which are ordered by object.

The copying can include copying across the programming language interface 412. The first and second programming languages are different. The first and second programming languages can include combinations of JAVA, C, C++, and assembly language.

At 504, the configured processor generates each of the objects 414 in the second programming language from the copied array 410. Each jth object is generated with a corresponding jth element of the copied array 410. In embodiments with a plurality of elements, each jth object is generated with a corresponding jth element of each copied array 410.

Figure 6:
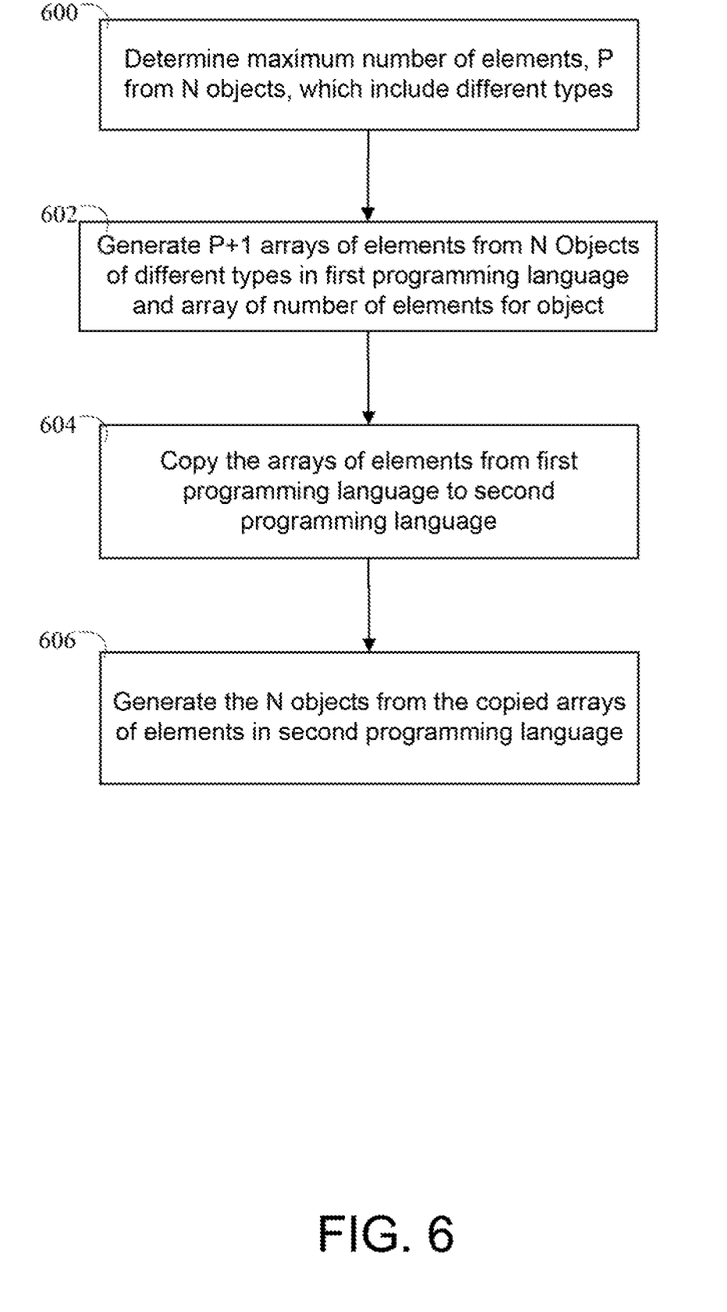
FIG. 6 is a flow chart illustration of an embodiment of the present invention.

FIG. 6 illustrates one embodiment of a method according to the present invention for copying objects between programming languages. At 600, a processor that is configured according to an aspect of the present invention (the "configured processor") determines a maximum number of elements, P of N objects of different types, where P is a positive integer. For example, the objects include a range of elements from 1-47 elements. Thus, a maximum is 47.

At 602, the configured processor generates P+1 arrays 406 in the first memory 400. A first array includes a count of the elements for the corresponding object. In some embodiments, the first array includes an object type identifier. The remaining P arrays include elements 404 of each object 402 of a plurality of objects in a first programming language. The order of the elements for each object is fixed. Items in a corresponding array for an object having fewer elements are null or empty.

For example, elements of rectangle object are ordered by width and then length. The elements of a baseball are ordered by cover, size and weight. The order of objects is fixed. That is, the order of the objects and the elements for each object are known to both a calling program and a called program. For example, a calling C program is either coded to receive the objects and elements in a predetermined order, or the order is passed as another parameter.

For example, the entry of an ith item in the first array corresponding to the rectangle object include a value of 2 or an identifier of the rectangle object from which the elements can be identified. The second array includes a width of the rectangle and the third array includes a length of the rectangle. Subsequent arrays in the ith item are empty or null. The entry of an rth item in the first array corresponding to the baseball includes the value of 3 or an object identifier of the baseball, and the second array includes a value for cover for the rth item. The third array includes the size, and a fourth array includes the weight.

At 604, the configured processor copies the arrays 402 in the first memory 400 to the second memory 408 of the second programming language. The arrays 402 can be copied as parameters passed by the calling program include a same order of elements in the array 410 of the called program.

The copying can include copying across the programming language interface 412. The first and second programming languages can include combinations of JAVA, C, C++, and assembly language, such as JAVA to C, C to JAVA, JAVA to C++, etc.

At 606, the configured processor generates each of the objects 414 in the second programming language from the copied arrays 410. Each object is generated with corresponding jth elements of the copied arrays 410 and the first array identifies the number of elements of the jth object.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for copying objects between programming languages, comprising executing on a computer processor:

generating a first plurality of arrays in a first memory of a first programming language to each comprise linear arrays of pluralities of elements that define each object of a plurality of first programming language objects in the first memory and that are ordered by corresponding object of the first programming language objects from which their respective elements are acquired, wherein each of the first plurality arrays comprise pluralities of different ones of the elements relative to others of the first arrays and that are acquired one each from different ones of the first programming language objects, and wherein each of the first plurality of arrays has a same linear array order defined with respect to the first programming language objects;

copying each of the first plurality of arrays in the first memory of the first programming language into corresponding ones of a second plurality of arrays of elements in a second memory of a second programming language, wherein the second programming language is different from the first programming language, and the second memory is different from the first memory; and generating each of a second plurality of objects in the second memory in the second programming language from the elements of the second plurality of arrays to each comprise pluralities of elements that correspond to pluralities of elements that define corresponding ones of the first programming language objects as a function of copying the first plurality of arrays of elements into the second plurality of arrays in the same linear array order.

2. The method of claim 1, wherein each object of the plurality of first programming language objects is a same type.

3. The method of claim 2, wherein a count of the plurality of objects is greater than a count of the plurality of arrays by an order of magnitude.

4. The method of claim 1, wherein the plurality of first programming language objects includes objects of a different type.

5. The method of claim 1, wherein the first programming language is selected from the group consisting of:
JAVA programming language;
C programming language;
C++ programming language; and
assembly programming language.

6. The method of claim 1, wherein the second programming language is selected from the group consisting of:
JAVA programming language;
C programming language;
C++ programming language; and
assembly programming language.

7. The method of claim 1, wherein the copying each of the first plurality of arrays into the corresponding ones of the second plurality of arrays is by a programming language interface.

8. A system for copying objects between programming languages, comprising:
a processor;
a computer readable memory in circuit communication with the processor; and
a computer readable storage medium in circuit communication with the processor;
wherein the processor executes program instructions stored on the computer readable storage medium via the computer readable memory and thereby:
generates a first plurality of arrays in a first memory of a first programming language to each comprise linear arrays of pluralities of elements that define each object of a plurality of first programming language objects in the first memory and that are ordered by corresponding object of the first programming language objects from which their respective elements are acquired, wherein each of the first plurality arrays comprise pluralities of different ones of elements relative to others of the first plurality arrays and that are acquired one each from different ones of the first programming language objects, and wherein each of the first plurality of arrays has a same linear array order defined with respect to the first programming language objects;
copies each of the first plurality of arrays in the first memory of the first programming language into corresponding ones of a second plurality of arrays of elements in a second memory of a second programming language, wherein the second programming language is different from the first programming language, and the second memory is different from the first memory; and
generates each of a second plurality of objects in the second memory in the second programming language from the elements of the second plurality of arrays to each comprise pluralities of elements that correspond to pluralities of elements that define corresponding ones of the first programming language objects as a function of copying the first plurality of arrays of elements into the second plurality of arrays in the same linear array order.

9. The system of claim 8, wherein a count of the first plurality of objects is greater than a count of the first plurality of arrays by an order of magnitude.

10. The system of claim 8, wherein the first plurality of objects include objects of a different type.

11. The system of claim 8, wherein the first programming language is selected from the group consisting of:
JAVA programming language;
C programming language;
C++ programming language; and
assembly programming language.

12. The system of claim 8, wherein the second programming language is selected from the group consisting of:
JAVA programming language;
C programming language;
C++ programming language; and
assembly programming language.

13. A computer program product for copying objects between programming languages, the computer program product comprising:
a computer readable storage medium having computer readable program code embodied therewith, the computer readable program code comprising instructions for execution by a processor that causes the processor to:
generate a first plurality of arrays in a first memory of a first programming language to each comprise linear arrays of pluralities of elements that define each object of a plurality of first programming language objects in the first memory and that are ordered by corresponding object of the first programming language objects from which their respective elements are acquired, wherein each of the first plurality arrays comprise pluralities of different ones of elements relative to others of the first arrays and that are acquired one each from different ones of the first programming language objects, and wherein each of the first plurality of arrays has a same linear array order defined with respect to the first programming language objects;
copy each of the first plurality of arrays in the first memory of the first programming language into corresponding ones of a second plurality of arrays of elements in a second memory of a second programming language, wherein the second programming language is different from the first programming language, and the second memory is different from the first memory; and
generate each of a second plurality of objects in the second memory in the second programming language from the elements of the second plurality of arrays to each comprise pluralities of elements that correspond to pluralities of elements that define corresponding ones of the first programming language objects as a function of copying the first plurality of arrays of elements into the second plurality of arrays in the same linear array order.

14. The computer program product of claim 13, wherein a count of the first plurality of objects is greater than a count of the first plurality of arrays by an order of magnitude.

15. The computer program product of claim 13, wherein the first plurality of objects include objects of a different type.

16. The computer program product of claim 13, wherein the first programming language is selected from the group consisting of:

JAVA programming language;
C programming language;
C++ programming language; and
assembly programming language.

17. The computer program product of claim 13, wherein the second programming language is selected from the group consisting of:
JAVA programming language;
C programming language;
C++ programming language; and
assembly programming language.

* * * * *